(12) United States Patent
Gilliland et al.

(10) Patent No.: US 6,499,890 B2
(45) Date of Patent: Dec. 31, 2002

(54) SURFACE MOUNTABLE OPTOELECTRONIC DEVICE

(75) Inventors: Patrick B. Gilliland, Chicago, IL (US); Robert M. Dwarkin, Chicago, IL (US); Carlos Jines, Forest Park, IL (US); Raul Medina, Chicago, IL (US)

(73) Assignee: Stratos Lightwave, Inc., Chicago, IL (US)

( * ) Notice: Subject to any disclaimer, the term of this patent is extended or adjusted under 35 U.S.C. 154(b) by 0 days.

(21) Appl. No.: 09/938,080

(22) Filed: Aug. 23, 2001

(65) Prior Publication Data

US 2002/0119684 A1 Aug. 29, 2002

Related U.S. Application Data (63) Continuation of application No. 09/796,029, filed on Feb. 28, 2001, now Pat. No. 6,358,066.

(51) Int. Cl.$^7$ .............................. G02B 6/36; H01R 12/00
(52) U.S. Cl. ..................... 385/88; 439/76.1; 439/607
(58) Field of Search ...................... 439/676, 607–609, 439/108, 76.1; 385/88–94, 14, 53

(56) References Cited

U.S. PATENT DOCUMENTS

| | | | |
|---|---|---|---|
| 5,011,246 A | 4/1991 | Corradetti et al. | 350/96.2 |
| 5,574,814 A | 11/1996 | Noddings et al. | 385/90 |
| 6,074,228 A * | 6/2000 | Berg et al. | 385/75 X |
| 6,086,429 A * | 7/2000 | Wu | 439/676 |
| 6,200,041 B1 | 3/2001 | Gaio et al. | 385/92 |
| 6,213,651 B1 | 4/2001 | Jiang et al. | 385/92 |
| 6,234,686 B1 * | 5/2001 | Tonai et al. | 385/88 |
| 6,239,427 B1 | 5/2001 | Mizue | 250/239 |
| 6,325,649 B2 * | 12/2001 | Stockhaus et al. | 439/180 |
| 6,350,063 B1 * | 2/2002 | Gilliland et al. | 385/88 |

* cited by examiner

Primary Examiner—Lynn Field
Assistant Examiner—Son Nguyen
(74) Attorney, Agent, or Firm—Karl D. Kovach (57) ABSTRACT

A device which is surface mountable to a printed circuit board. The device includes a housing, an optical sub-assembly, and an electrical connector. The housing includes a fiber optic connector receptacle and a bottom side. The housing is made of an electrically conductive material. The optical sub-assembly is associated with the fiber optic connector receptacle. The electrical connector has contacts, where some portions of the contacts extend into the housing and some portions of the contacts extend from the housing. A portion of the contacts being in a same plane with the bottom side of the housing.

14 Claims, 9 Drawing Sheets

SURFACE MOUNTABLE OPTOELECTRONIC DEVICE

This is a continuation of U.S. patent application Ser. No. 09/796,029, now U.S. Pat. No. 6,358,066, filed Feb. 28, 2001, which is hereby incorporated herein by reference.

BACKGROUND OF THE INVENTION

1. Field of the Invention

The present invention pertains to a transceiver. The invention more particularly concerns a transceiver that is mountable to a surface of a printed circuit board.

2. Discussion of the Background

A transceiver is a device that contains at least one opto-electronic receiver and at least one opto-electronic transmitter. An opto-electronic transmitter receives electrical signals, converts them to light signals, and then transmits the light signals. An opto-electronic receiver receives light signals, converts them to electrical signals, and then transmits the electrical signals. Known transceivers are soldered to printed circuit boards where their pins and posts extend through through holes formed in the printed circuit board or the transceivers are plugged into receptacles which are in turn mounted to a printed circuit board.

In order to save space, the use of a receptacle mounted to a printed circuit board is not acceptable and in other situations a printed circuit board does not utilize through holes into which pins may be projected and secured to the printed circuit board. Such environmental constraints require that a new mounting structure be formulated for attaching a transceiver to a printed circuit board.

Additionally, another problem is present with the use of known transceivers. Typically, the manufacturer of the transceiver is different than, the manufacturer of the host device into which the transceiver is incorporated. Often times, this situation requires the use of additional electronic components which are mounted on the printed circuit board between the transceiver and the remainder of the printed circuit board so as to match the impedance of the transceiver to the electronics on the remainder of the printed circuit board. If the impedances are not matched, the system does not operate at its maximum potential since the flow of energy flowing from the transceiver to the host device and from the host device to the transceiver is restricted. The total cost of the additional electronic components required for the impedance matching includes the purchase cost of the additional electronic components, the storage cost of keeping the additional electronic components in inventory, and the labor cost of installing the additional electronic components. Furthermore, the additional electronic components occupy space, thus increasing the size of the host device, which is not desirable.

SUMMARY OF THE INVENTION

It is an object of the invention to provide a transceiver having a reduced size as compared to known transceivers.

It is a further object of the invention to provide a transceiver which is mountable i to a surface of a printed circuit board.

It is another object of the invention to provide a transceiver having a controlled impedance electrical connection so that matching electronics are not necessary on or near the printed circuit board and so that the performance of the host device system, including the transceiver, is maximized.

It is another object of the invention to provide a transceiver having a connector or contacts which provide the function of impedance matching by adjusting the geometry, of the conductors.

In one form of the invention the transceiver includes a housing, a transmitting optical sub-assembly mounted in the housing, a receiving optical sub-assembly mounted in the housing, a first electrical connector associated with the transmitting optical sub-assembly, a second electrical connector associated with the receiving optical sub-assembly, and an electro-magnetic shield mounted on the housing. The housing includes a first fiber optic connector receptacle, a second fiber optic connector receptacle, and a first side, and the housing is made of an electrically conductive material. The housing further includes a first alignment post and a second alignment post both of which are attached to the first side of the housing. The transmitting optical sub-assembly is associated with the first fiber optic connector receptacle. The receiving optical sub-assembly is associated with the second fiber optic connector receptacle. The first electrical connector projects from the housing and has a first plurality of contacts. A first contact of the first plurality of contacts is electrically grounded to the housing. The second electrical connector projects from the housing and has a second plurality of contacts. A second contact of the second plurality of contacts is electrically grounded to the housing. Additionally, so as to make the transceiver surface mountable to a host device printed circuit board, the side of the housing, a first portion of the first plurality of contacts, and a second portion of the second plurality of contacts substantially exist in a first plane. The electro-magnetic shield mounted on the housing prevents electromagnetic fields from passing between the housing and a host device panel cut-out.

In another form of the invention, the transceiver contains the features described above and further includes the features of the first plurality of conductors and the second plurality of conductors being configured so as to substantially match an impedance of the transceiver with an impedance of the host device.

In another form of the invention, the transceiver contains the features described above and further includes the features of a first dielectric material substantially positioned between each contact of the first plurality of contacts, and a second dielectric material substantially positioned between each contact of the second plurality of contacts.

Another form of the invention includes a method of mounting a transceiver to a printed circuit board of a host device, where the printed circuit board of the host device is substantially flat. The method includes the steps of placing the transceiver on the surface of the printed circuit board of the host device so that a side of the transceiver contacts the surface of the printed circuit board of the host device and so that contacts of the transceiver contact the surface of the printed circuit board of the host device; grounding a chassis of the transceiver of the printed circuit board of the host device; and soldering the contacts of the transceiver to the printed circuit board of the host device.

Thus, the invention achieves the objectives set forth above. The invention provides a transceiver which is compact and incorporates an impedance matching electrical connection.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENTLY PREFERRED EMBODIMENT

Referring now to the drawings, wherein like reference numerals designate identical or corresponding parts throughout the several views, and more particularly to FIGS. 1–6 thereof, an embodiment of the present invention is a device or transceiver 10 which is displayed therein.

Figure 1:
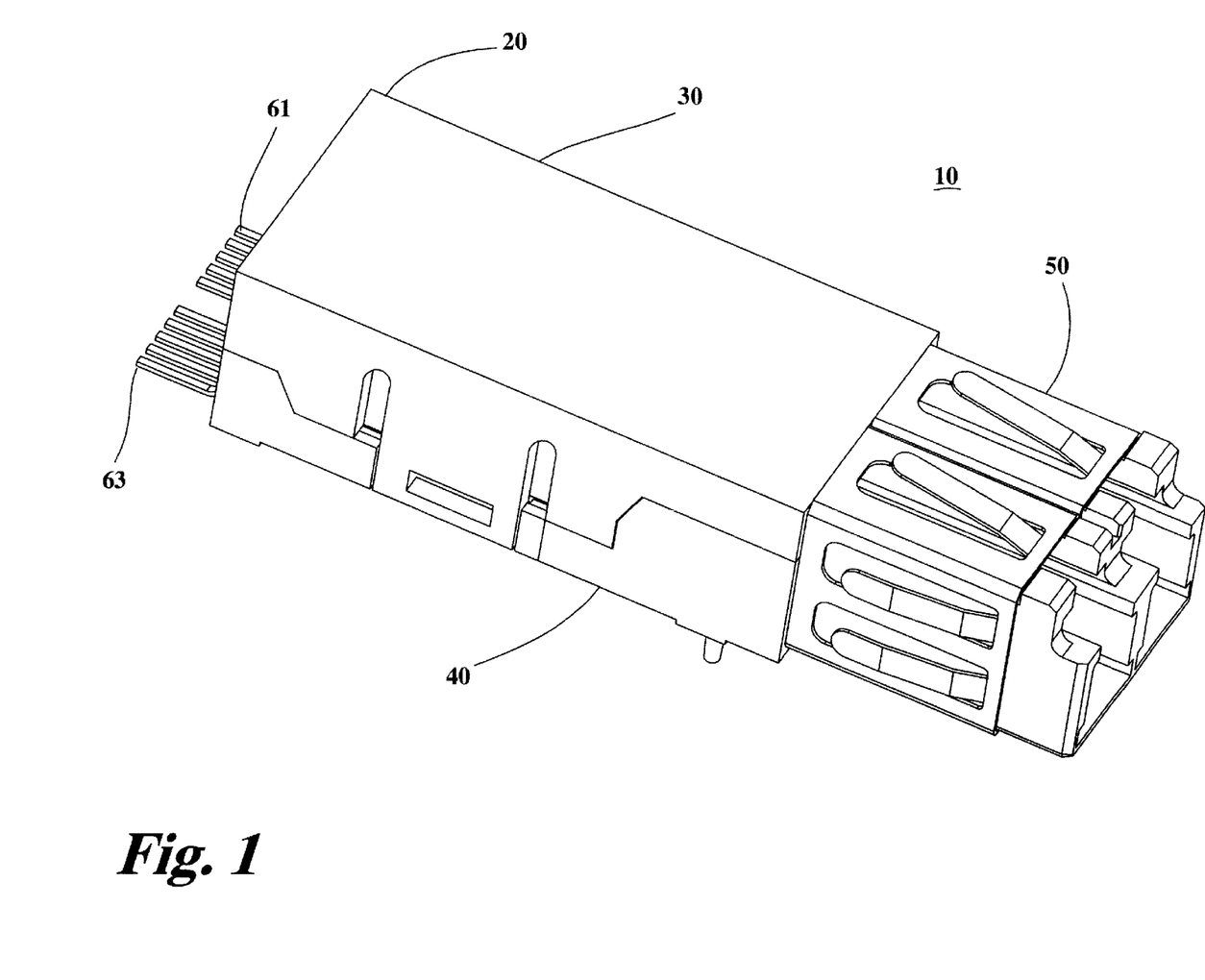
FIG. 1 is a perspective view of the transceiver of the invention.
Figure 2:
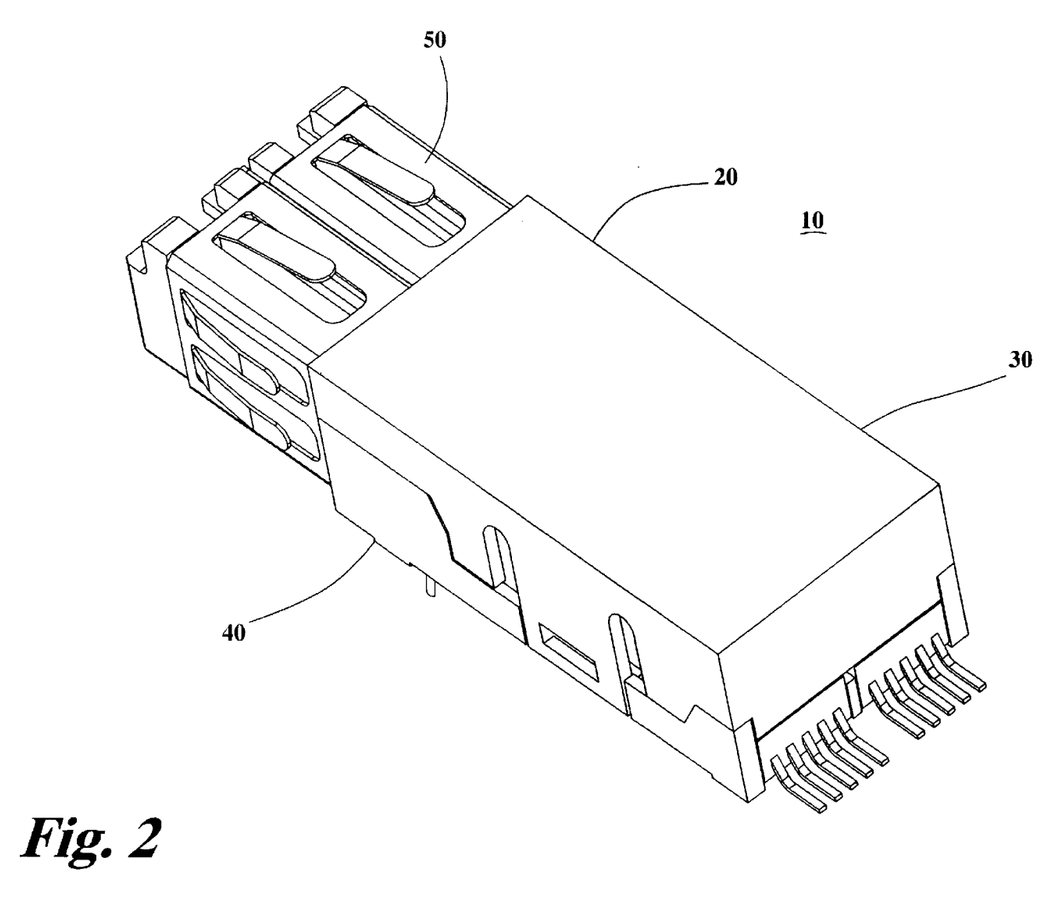
FIG. 2 is another perspective view of the transceiver of FIG. 1 taken from a different angle.

FIG. 1 is a perspective view of the transceiver 10. FIG. 2 is a perspective view of the transceiver 10 taken from an angle different than the angle presented in FIG. 1. FIGS. 1 and 2 show the housing 20 the electro-magnetic shield 50, the first electrical connector 61, and the second electrical connector 63.

Figure 3:
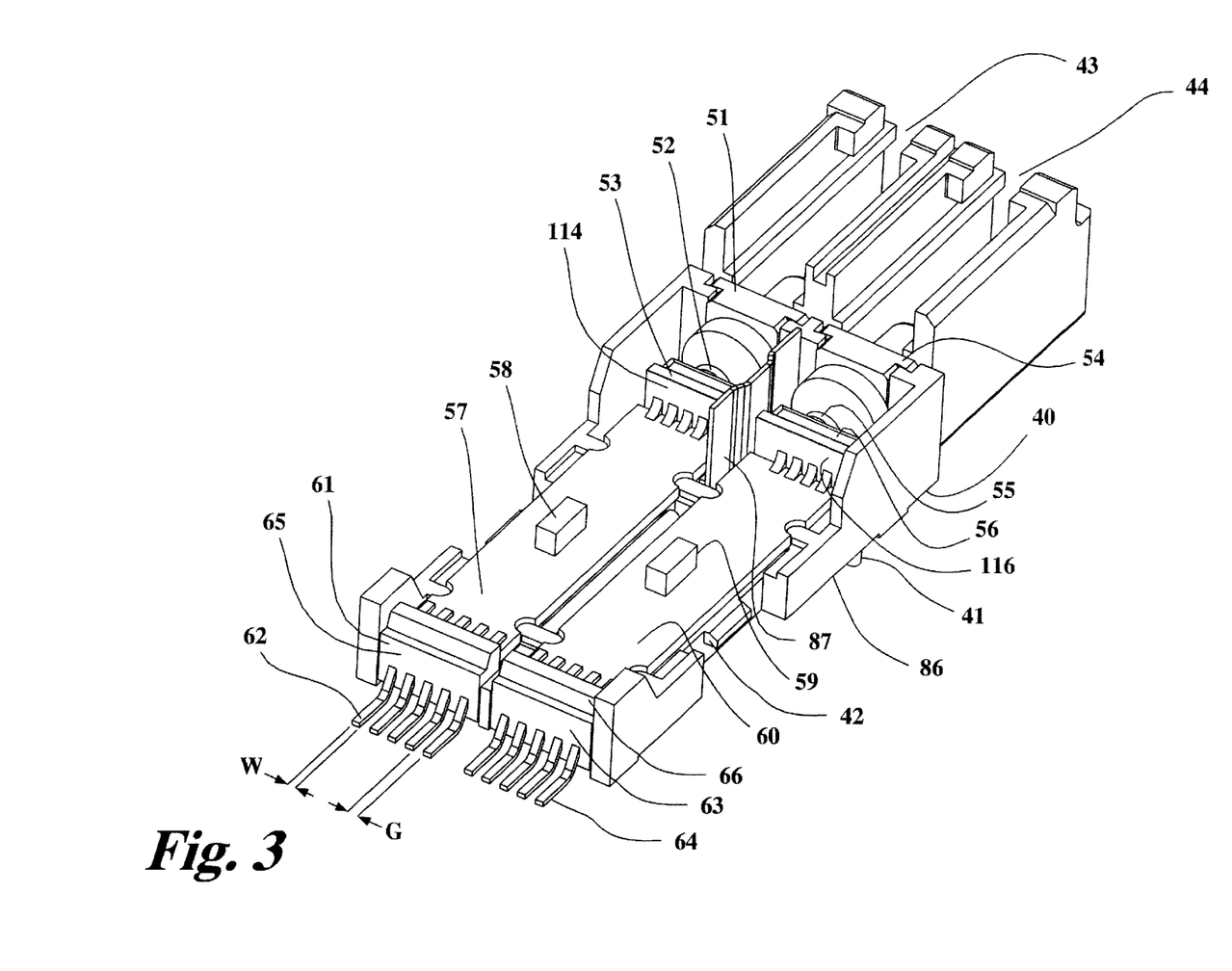
FIG. 3 is a perspective view of the internal components of the transceiver of FIG. 1.
Figure 4:
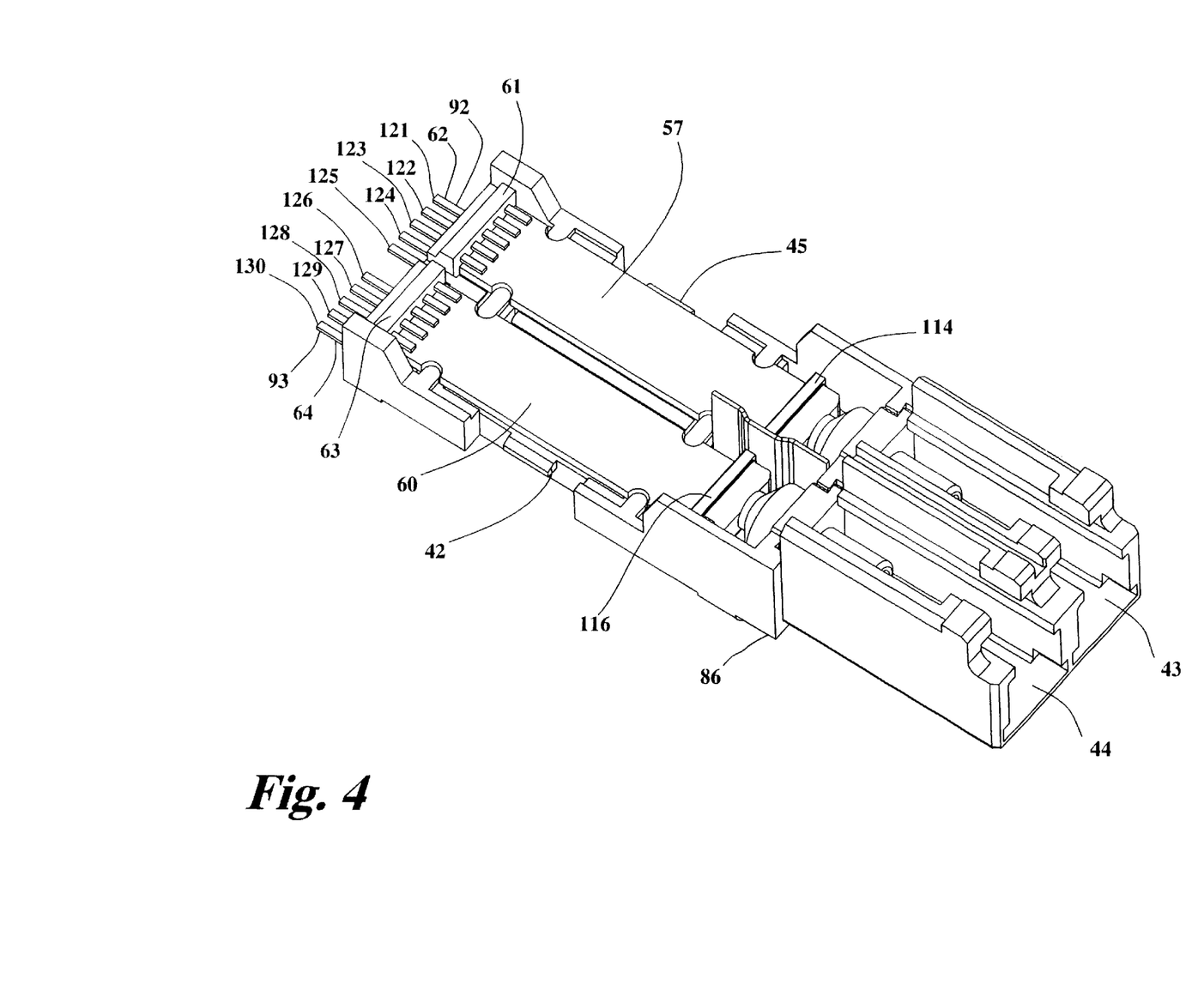
FIG. 4 is another perspective view of the internal components of the transceiver of FIG. 3.

FIG. 3 is a perspective view of the transceiver 10 having the cover 30 and the electromagnetic shield 50 removed thus exposing the base 40 and the components mounted within the base 40 of the housing 20. FIG. 4 is a perspective view of the base 40 of the housing 20 of the transceiver 10 taken from an angle different than the angle presented in FIG. 3. The base 40 of the housing 20 includes a first fiber optic connector receptacle 43 and a second fiber optic connector receptacle 44. Both of the fiber optic connector receptacles 43, 44 are formed so as to receive an industry standard LC connector as disclosed in U.S. Pat. No. 5,481,634, which is hereby incorporated herein by reference, and in "Selecting a Small-Form-Factor Fiber Optic Connector for Private Networks," Fiber Optic Technical Bulletin 21, published by Lucent Technologies, Inc.

Associated with the first fiber optic connector receptacle 43 is a transmitting optical element package 53. Interposed between the transmitting optical element package 53 and the first fiber optic connector receptacle 43 is an optical coupling element 51 having a metal ring 52. The metal ring 52 is pressed onto the optical coupling element 51 and is laser welded to the transmitting optical element package 53. The optical coupling element 51 contains a focusing element (not shown) and a ferrule receiving bore (not shown). The transmitting optical element package 53 contains four soldering locations on a flat surface away from the metal ring 52 so as to mechanically and electrically connect the transmitting optical element package 53 to a substrate 57. Details of the assembly and operation of the optical coupling element 51, metal ring 52, and the transmitting optical element package 53 are disclosed in U.S. patent application Ser. No. 09/633,511 filed Aug. 7, 2000, which is hereby incorporated herein by reference. Together, the connector receptacle 43, the metal ring 52, and the transmitting optical element package 53 form a transmitting optical sub-assembly (TOSA) 114.

Associated with the second fiber optic connector receptacle 44 is a receiving optical element package 56. Interposed between the receiving optical element package 56 and the second fiber optic connector receptacle 44 is an optical coupling element 54 having a metal ring 55. The receiving optical element package 56 contains four soldering locations on a flat surface away from the metal ring 55 so as to mechanically and electrically connect the receiving optical element package 56 to a substrate 60. The details of the assembly of the receiving optical element package are similar to the details of the assembly of the transmitting optical element package described above. Together, the connector receptacle 44, the metal ring 55, and the transmitting optical element package 56 form a receiving optical sub-assembly (ROSA) 116.

The first substrate 57 contains electrical signal conditioning components 58 and the first electrical connector 61. The electrical signal conditioning components 58 electrically connect the transmitting optical element package 53 to the first electrical connector 61. The first electrical connector 61 includes five contacts which form a first plurality of contacts 62 and dielectric material 65 substantially positioned between each contact. The dielectric material 65 can be made of liquid crystal polymer. The contacts can be made of gold over phosphor bronze. Furthermore, one contact of the first plurality of contacts 62 is grounded to the housing 20 so as to make circuit ground and chassis ground one and the same. In the embodiment shown in FIG. 4, a first contact 121 is PIN 1, a second contact 122 is PIN 2, a third contact 123 is PIN 3, a fourth contact 124 is PIN 4, and a fifth contact is PIN 5 of the device. The first electrical connector 61 includes the functions of a differentially driven optical transmitter with PIN 1=ground; PIN 2=inverted data. Q; PIN 3=data, Q; PIN 4=transmit disable, TD; and PIN 5=supply voltage, V.

The second substrate 60 contains electrical signal conditioning components 59 and the second electrical connector 63. The electrical signal conditioning components 59 electrically connect the receiving optical element package 56 to the second electrical connector 63. The second electrical connector 63 includes five contacts which form a second plurality of contacts 64 and dielectric material 66 substantially positioned between each contact. The dielectric material 66 can be made of liquid crystal polymer. The contacts can be made of gold over phosphor bronze. Furthermore, one contact of the first plurality of contacts 64 is grounded to the housing 20 so as to make circuit ground and chassis ground one and the same. In the embodiment shown in FIG. 4, a sixth contact 126 is PIN 6, a seventh contact 127 is PIN 7, a eighth contact 128 is PIN 8, a ninth contact 129 is PIN 9, and a tenth contact is PIN 10 of the device. The second electrical connector 63 includes the functions of an optical receiver with differential outputs with PIN 10 ground; PIN 9=inverted data, Q; PIN 8=data, Q; PIN 7=signal detect, SD; and PIN 6=supply voltage, V.

A shielding insert 87 is insertable into the base 40 of the housing 20 between the transmitting optical element package 53 and the receiving optical element package 56 so as to reduce the effects of electromagnetic interference or cross-talk between the two optical element packages.

Additionally, as shown in FIGS. 3 and 4, the base 40 of the housing 20 includes two alignment posts 41 (one of which is shown) attached to a side 86 of the base 40, and a first protrusion latch 45 and a second protrusion latch 42.

Figure 5:
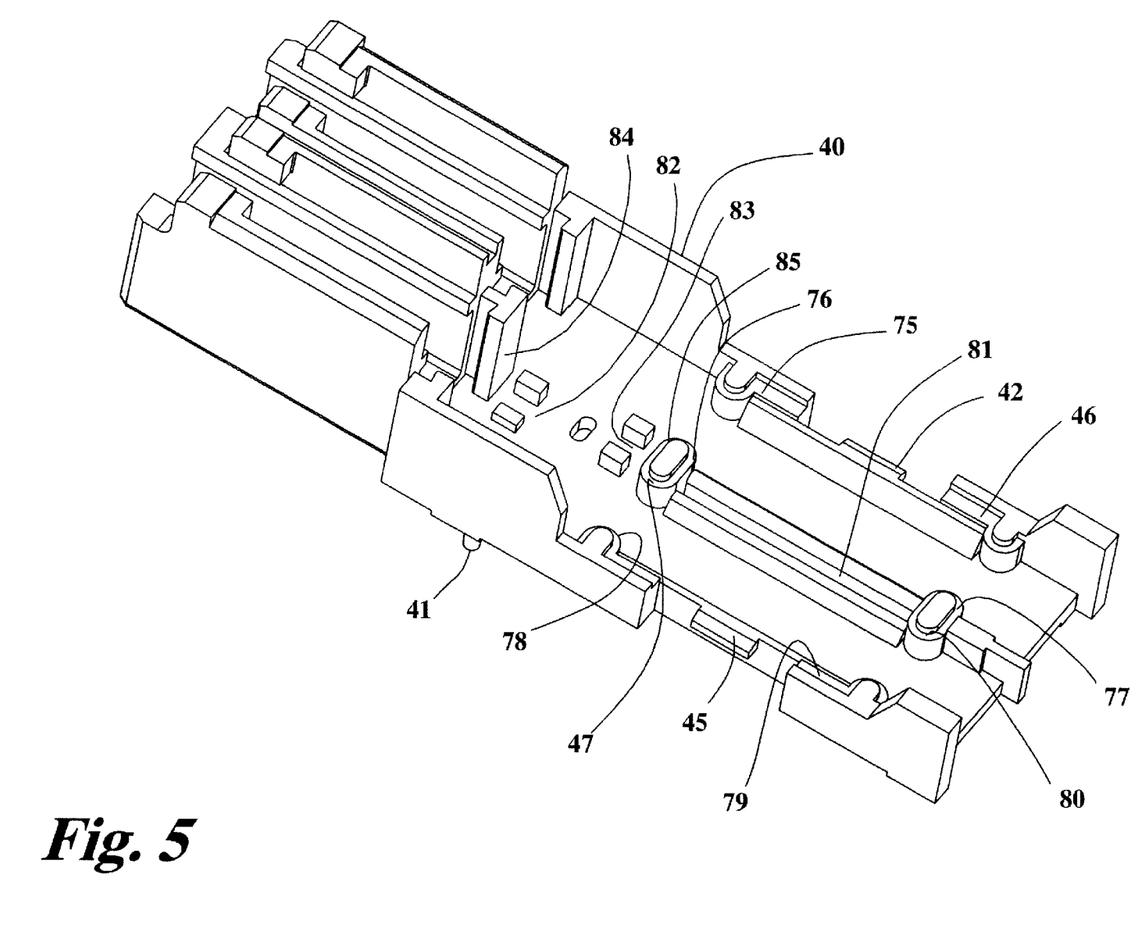
FIG. 5 is a perspective view of the base of the transceiver of FIG. 1.

FIG. 5 is perspective view of the base 40 of the housing 20 of the transceiver 10. FIG. 5 shows the ledges 47, 80, 79. 78 which support the first substrate 57 (not shown) and the ledges 75, 76, 77, 46 which support the second substrate 60 (not shown). Slots 82, 83 accept, support, and align the shielding insert 87 along with restraining surface 84, 85. Additionally, one of the two alignment posts 41, and the protrusion latches 42, 45 are shown in FIG. 5.

Figure 6:
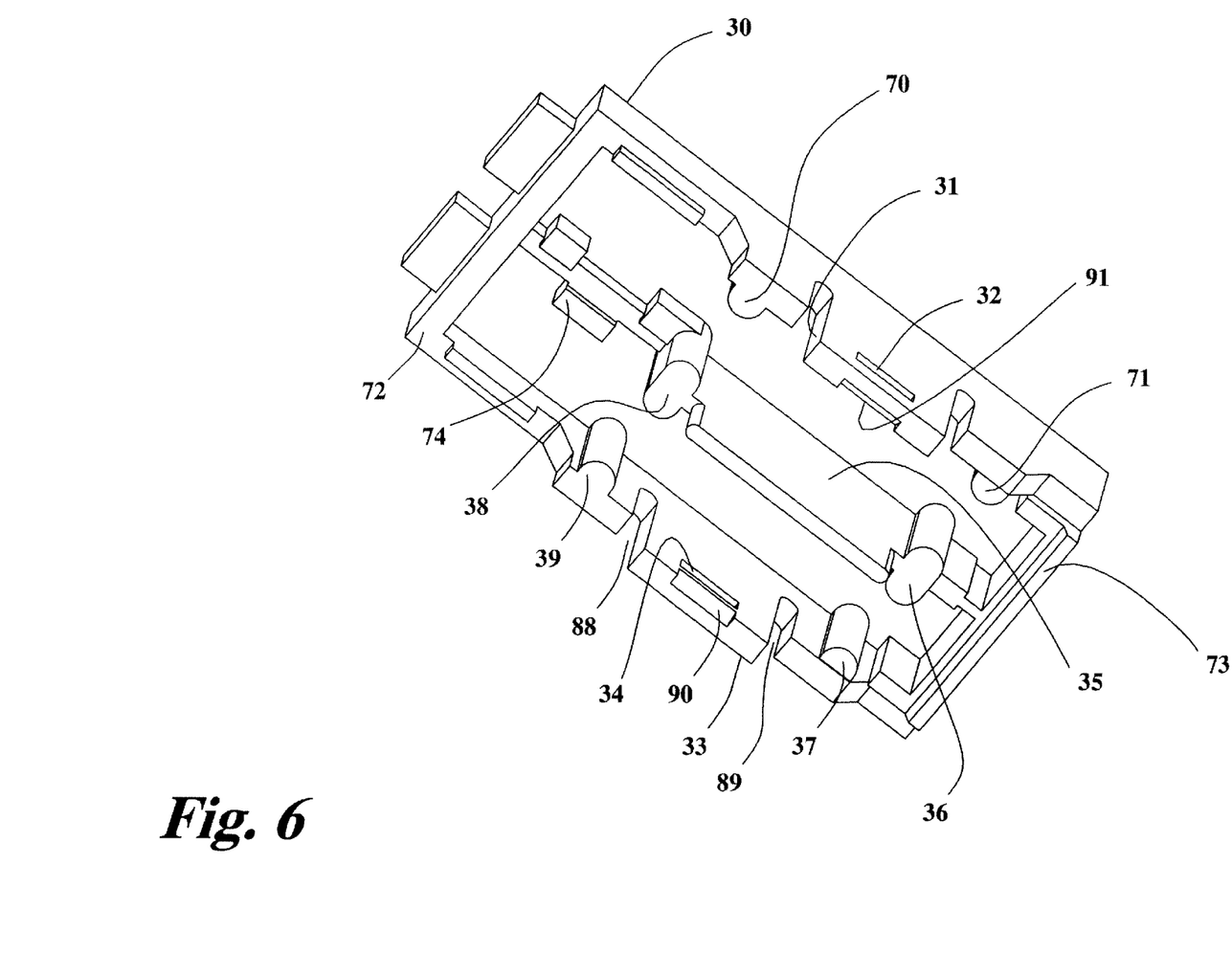
FIG. 6 is a perspective view of the cover of the transceiver of FIG. 1.

FIG. 6 is a perspective view of the cover 30 of the housing 20 of the transceiver 10. The cover 30 includes a protrusion 74, a wall 35, complementary ledges 37, 36, 71, 38, 39, 70, electrical connector retaining surface 73, and optical connecting element retaining surface 72. The protrusion 74 retains the electro-magnetic shield 50 in the base 40. The wall 35 fits and is insertable into the slot 81 of the base 40 (see FIG. 5) so as to provide electromagnetic shielding between the first substrate 57 and the second substrate 60 (see FIG. 4). Complementary ledges 36, 38, 70, 71 retain the first substrate 57 and complementary ledges 36, 38, 39, 37 retain the second substrate 60. The electrical connector retaining surface 73 retains the first electrical connector 61 and the second electrical connector 63. The optical connecting element retaining surface 72 retains the first optical connecting element 51 and the second optical connecting element 54.

The cover 30 further includes a first elastic arm 31 having a first recess 32 and a second elastic arm 33 having a second recess 34. The shape of the first recess 32 is complementary to the shape of the first protrusion latch 45. The shape of the second recess 34 is complementary to the shape of the second protrusion latch 42. Formed adjacent to the first recess 32 is a first sliding surface 91 and formed adjacent to the second recess 34 is a second sliding surface 90. When the cover 30 is introduced onto the base 40, the first sliding surface 91 contacts the protrusion latch 45 of the base 40 and the second sliding surface 90 contacts the protrusion latch 42 of the base 40. Upon further introduction of the cover 30 toward the base 40, the fist sliding surface 91 slides against the protrusion latch 45 and the second sliding surface 90 slides against the protrusion latch 42, and the first elastic arm 31 and the second elastic arm 33 are deflected away from each other. Upon still further introduction of the cover 30 toward the base 40, the protrusion latch 45 enters the first recess 32 and the protrusion latch 42 enters the second recess 34, at which time the first elastic arm 31 and the second elastic arm move toward each other toward their non-deflected positions so as to lock the cover 30 to the base 40.

The elastic characteristics of the first elastic arm 31 and the second elastic arm 33 are influenced by material characteristics and geometry of the part. A first slot 89 and a second slot 88 define the cantilevered length of the second elastic arm 33. As the slots 88, 89 become longer, the end of the second elastic arm 33 is able to deflect over a longer distance while staying in the elastic range. Thus, the length of the slots 88, 89 can be determined so as to allow the second elastic arm 33 to clear the detent 42 without breaking or entering the plastic range. The first elastic arm 31 is formed in a similar manner.

The base 40, the cover 30, the shielding insert 87 are made by a die casting technique that uses a zinc alloy as the material of construction. The preferred zinc alloy trades under the name ZAMAK3 and is well known in the art. The electromagnetic shield 50 is made of phosphor bronze or beryllium copper. The transmitting optical element package 53 and the receiving optical element package 56 operate at speeds substantially equal to ten gigabits per second.

Figure 7:
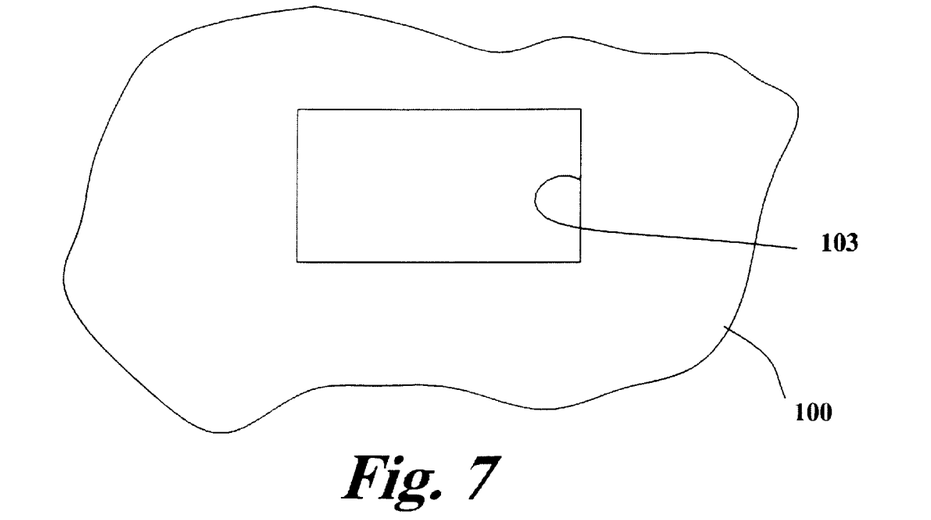
FIG. 7 is a plan view of a panel cut-out for accepting the transceiver of FIG. 1 including the shielding.

FIG. 7 is a plan view of a cut-out 103 on the panel of a host device 100. When the transceiver 10 is mounted to the host device 100, the electromagnetic shield 50 contacts the cut-out 103 of the host device 100 so as to eliminate or reduce the amount of electro-magnetic radiation which passes between the cut-out 103 and the housing 20 of the transceiver 10.

Figure 8:
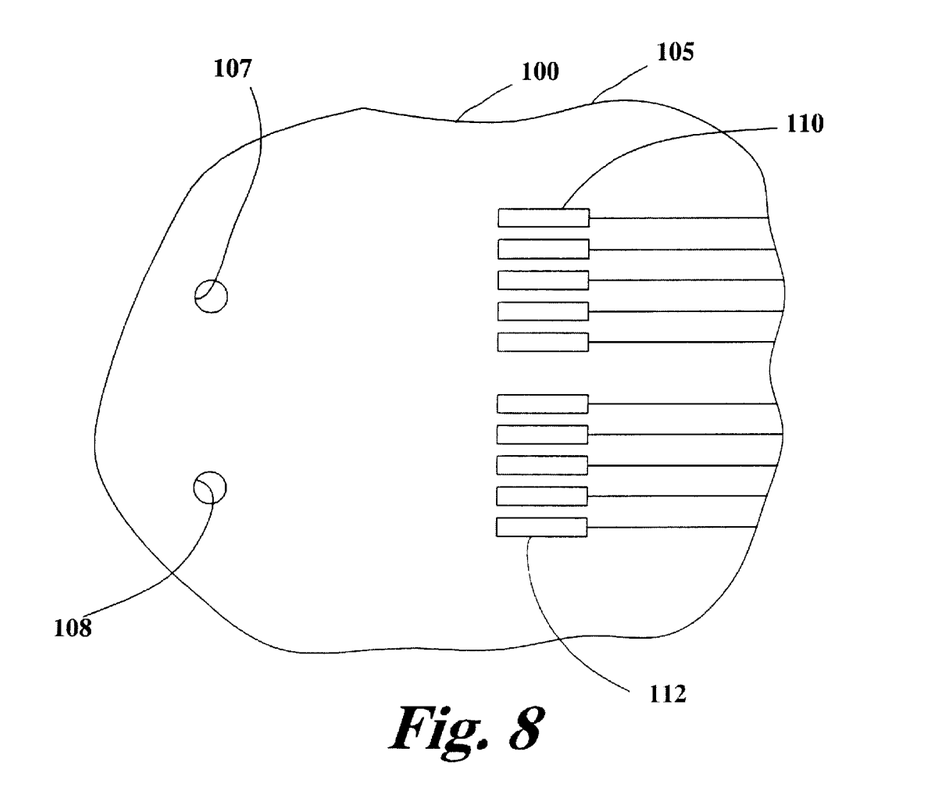
FIG. 8 is a plan view of a pad prepared on the printed circuit board for accepting the transceiver of FIG. 1.

FIG. 8 is a plan view of a pad prepared on the printed circuit board 105 of the host device 100 for accepting the surface mounting of the transceiver 10 thereto. The pad includes a first alignment post receiving aperture 108, a second alignment post receiving aperture 107, a first set of electrical contact connector pads 112, and a second set of electrical contact connector pads 110. When the transceiver is mounted to the host device 10, the side 86 (FIG. 4) of the base 40 of the transceiver contacts the surface of the printed circuit board 105 of the host device 100 and a first portion 92 of the first plurality of contacts 62 substantially exist in a flat plane with a second portion 93 of the second plurality of contacts 64, and with the side 86 so as to be surface mountable to the printed circuit board 105 of the host device 100. The assembly of the transceiver 10 and the host device 100 is then subject to a reflow process so as to solder the transceiver 10 to the host device 100. Such an assembly allows for the attachment of the transceiver 10 to the printed circuit board 105 when no access is provided to the other side of the printed circuit board 105.

The impedance of the connectors 61, 63 are fashioned by changing the geometry of the respective plurality of contacts 62, 64 by altering each contacts thickness and/or width. At low frequencies or low operating speeds, the impedance of the contacts due to their shape is only as small portion of the impedance since the geometry of the contact is only a small fraction of the signal wavelength. Operating speeds in the range of ten gigabits per second introduce significant impedance problems that must be addressed with separate electronics or the altering of the geometry of the electrical components. Thus, the overall impedance of the transceiver 10, including the housing 20, can be matched to the impedance of the host device 100 and the size of the overall assembly is reduced.

Figure 9:
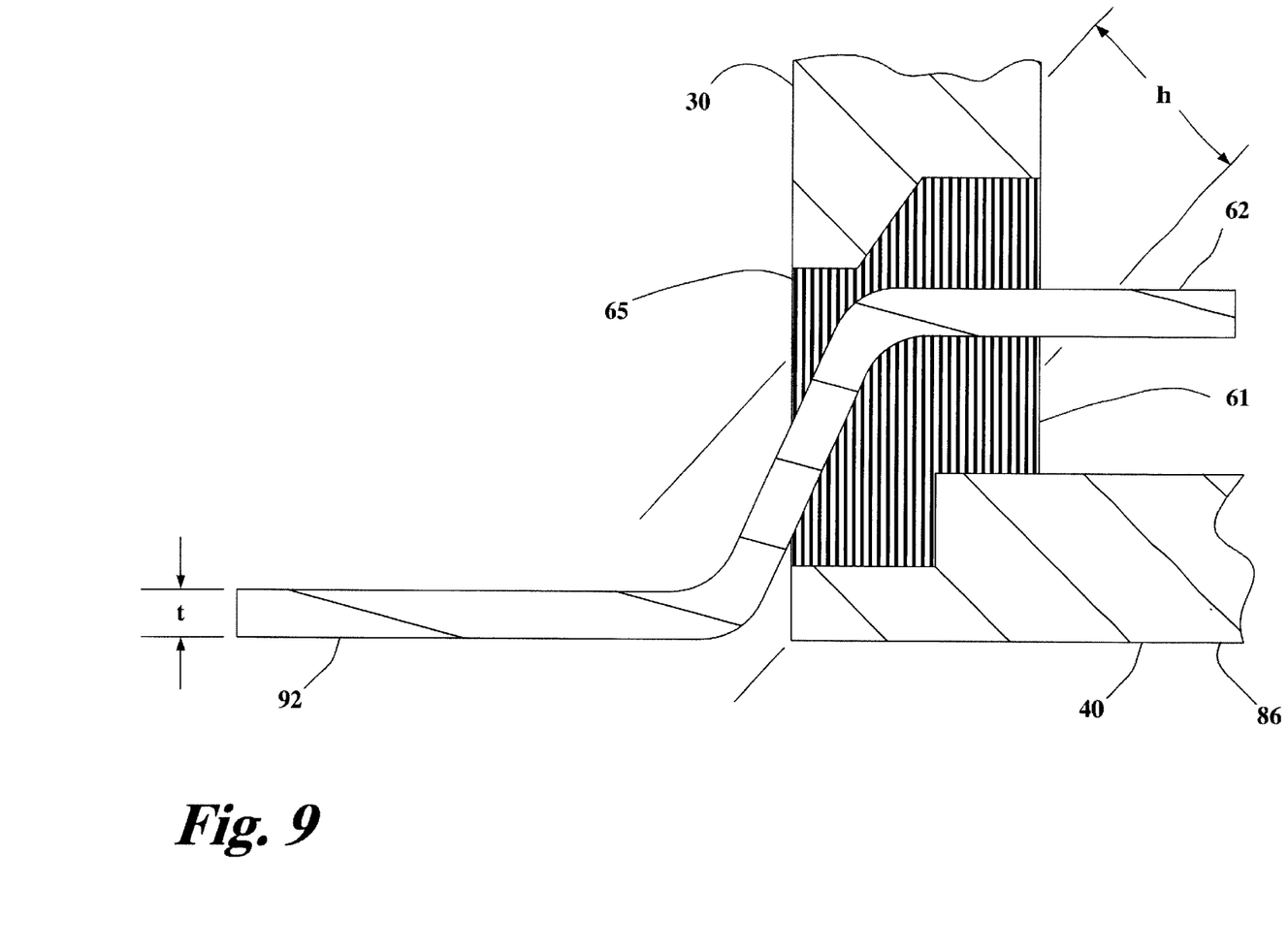
FIG. 9 is a cross-sectional view of a contact of the first electrical conductor.

FIG. 9 is a cross-sectional view of a contact of the first plurality of contacts 62 of the first electrical connector 61, the dielectric material 65 of the first electrical connector 61, a portion of the cover 30, and a portion of the base 40. Each contact of the first electrical connector 61 and the second electrical connector 63 are similarly constructed. The bottom side or side 86 of the base 40 is also shown along with the first portion 92 of the first plurality of contacts 62 which substantially exist in a flat plane with the side 86 of the base 40. Some parts of the first plurality of contacts 62 extend into the housing and some parts of the first plurality of contacts 62 extend from the housing. The cover 30 and the base 40 act as grounding planes which are separated by the dielectric material 65.

A well known equation (1) predicts the impedance of the connector. $Z_{diff}$, by taking into account the contact width, W, the contact thickness, t, spacing distance between adjacent contacts, G, distance between the ground planes (cover 30 and base 40) separated by the dielectric material, h, the dielectric constant of the dielectric material, $\epsilon_r$, the dielectric material permeability, $\mu_r$, and the free space impedance, $\eta_o$. In this embodiment, the constants have the following values: W=0.020 inches; t=0.005 inches; G=0.020 inches;

h=0.025 inches; $\in_r$=2.5; $\mu_r$=1; and $\eta_o$=120×π ohms per inch. The odd-mode characteristic impedance is identified by $Zc_o$, and the differential impedance is identified by $Z_{diff}$. The odd-mode characteristic impedance, $Zc_o$, of the coupled structure is one-half the value of the differential impedance, $Z_{diff}$. The electrodes or contacts are differently excited, and the differential impedance, $Z_{diff}$, is thus exactly twice the odd-mode impedance, $Zc_o$. As shown below, $C_f$ and $A_o$ are intermediate calculating variables so as to divide the equation up into manageable pieces. The equation follows:

$$Z_{diff}=2\times Zc_o \quad (1)$$

where, $Zc_o=(\eta_o\times((2\times h)-t)/(4\times((\in_r)^{1/2})\times(W+C_f\times A_o\times(h/\pi)))$;

$C_f=(2 \times \ln(((4\times h)-t)/((2\times h)-t)))-((t/(2\times h))\times\ln((t\times((4\times h)-t))/(2\times h-t)^2))$; and $A_o=1+((1/(\ln(2)))\times\ln(1+\coth((\pi\times G)/(4\times h))))$.

Thus, the value of impedance of the printed circuit board is a known design parameter. Therefore, the impedance of the electrical connector and associated housing is manipulated so that it is approximately equal to the impedance of the printed circuit board. The values W, t, h, G, $\in_r$, $\mu_r$, and $\eta_o$ are back calculated and adjusted so as to provide the desired impedance. In this example: $A_o$=2.483, $C_f$=1.639, $Zc_o$=51.159 ohms, and $Z_{diff}$=102.317 ohms.

Figure 10:
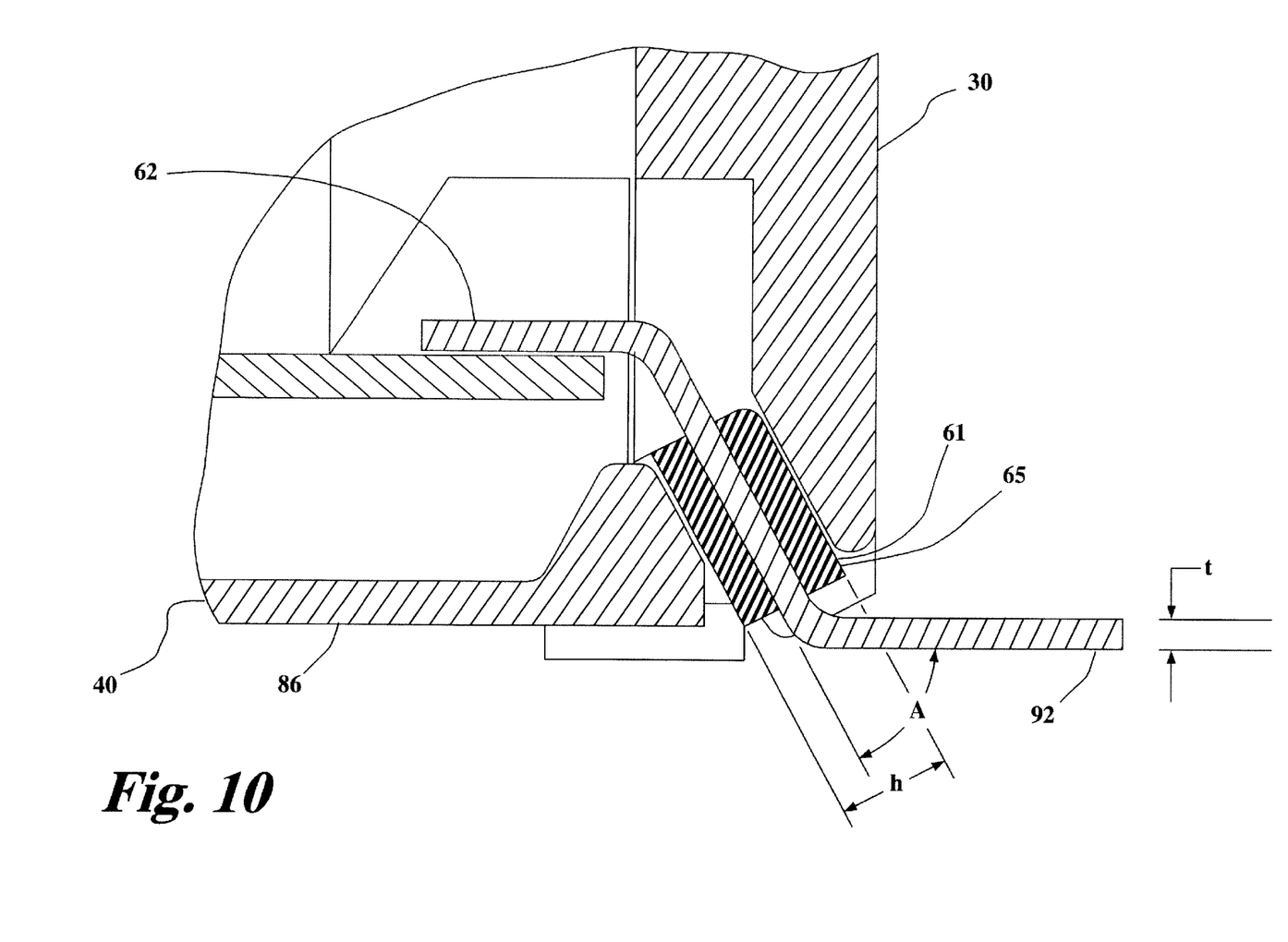
FIG. 10 is a cross-sectional view of a preferred embodiment of the first electrical conductor.

FIG. 10 is a cross-sectional view of a preferred embodiment of the first electrical connector 61. The components are similar to the components discussed in FIG. 9, thus the same numeral designators are used to identify the same or similar components. The most notable change is that the width of the dielectric material 65 is maintained at substantially a constant value which provides a substantially constant value for the distance between the ground planes (cover 30 and base 40). The geometry of the dielectric material 65 and the complementary shape of the cover 30 and base 40 provides a closer correlation of the theoretical and analytical values of impedance. The angle A of the bent contact of the first electrical connector 61 is substantially sixty degrees. The second electrical connector 63 (not shown) is formed similarly as is the first electrical connector 61 of this embodiment.

In operation, when a fiber optic connector is plugged into a fiber optic connector receptacle 43, 44 of the transceiver 10, a force is developed between the fiber optic connector and the associated receptacle 43, 44 of the transceiver 10 which must be reacted out of the transceiver 10 so as to maintain an equilibrium of forces applied to the transceiver 10. The solution to the problem is solved through the use of alignment posts 41. The alignment posts 41 react the force out of the transceiver 10 and into the printed circuit board 105 of the host device 100 through the apertures 107, 108 of the host device 100. Thus, the alignment posts 41 provide a load path for forces exerted on the transceiver 10, and, as such, substantial forces do not flow through the contacts 62, 64 of the first and second electrical connectors 61, 63. Therefore, a good electrical connection is maintained between the contacts 62, 64 of the transceiver 10 and the electrical contact connector pads 110, 112 of the printed circuit board 105 of the host device 100.

Obviously, numerous modifications and variations of the present invention are possible in light of the above teachings. It is therefore to be understood that within the scope of appended claims, the invention may be practiced otherwise than as specifically described herein.

What is claimed is:

1. A device comprising:
   a housing having a fiber optic connector receptacle, the housing having a bottom side, and the housing being made of an electrically conductive material;
   an optical sub-assembly mounted in the housing and being associated with the fiber optic connector receptacle;
   an electrical connector electrically associated with the optical sub-assembly and projecting from the housing, the electrical connector having a plurality of contacts, and wherein at least one contact of the plurality of contacts being electrically grounded to the housing, and wherein the plurality of contacts have first portions and second portions, the first portions of the plurality of contacts extend from the housing, the second portions of the plurality of contacts extend into the housing, and wherein the bottom side of the housing and the first portions of the plurality of contacts being substantially parallel in a same plane so as to be surface mountable to a host device printed circuit board; and
   a substrate attached to the optical sub-assembly and to the electrical connector, the substrate having electrical signal conditioning components mounted thereon, and wherein the electrical signal conditioning components electrically connect the optical sub-assembly to the electrical connector, and wherein
      the housing has a first end and a second end, and wherein the fiber optic connector receptacle being at the first end of the housing, and wherein the electrical connector projects from the housing at the second end of the housing, and wherein
      the housing is made of a metallic material, and wherein
         a cover of the housing includes a first recess formed in a first elastic arm, and a second recess formed in a second elastic arm, and wherein a base of the housing includes a first protrusion latch having a shape complementary to a shape of the first recess and a second protrusion latch having a shape complementary to a shape of the second recess, and wherein, upon introducing the cover to the base, the first elastic arm and the second elastic arm deflect from a non-deflected position as the first protrusion latch slides against the first elastic arm and the second protrusion latch slides against the second elastic arm, and wherein, upon attaching the cover to the base, the first protrusion latch fits in the first recess and the second protrusion latch fits in the second recess and the first elastic arm and the second elastic arm deflect back toward the non-deflected position.

2. A device according to claim 1, further comprising a first alignment post attached to the bottom side of the housing, and a second alignment post attached to the bottom side of the housing, and wherein the housing includes a base and a cover, and wherein the bottom side of the housing, the first alignment post, and the second alignment post are associated with the base.

3. A device according to claim 2 wherein the fiber optic connector receptacle conforms to an LC fiber optic connector standard.

4. A device according to claim 3 wherein the optical sub-assembly operates at speeds substantially equal to ten gigabits per second.

5. A device according to claim 4 wherein the metallic material of the housing being a zinc alloy.

6. A device according to claim 5 wherein the plurality of contacts being made of gold over phosphor bronze.

7. A device according to claim 6, further comprising a shielding insert mounted in the housing adjacent to the optical sub-assembly, and wherein the shielding insert is made of an electrically conductive material and being electrically connected to the housing.

8. A device according to claim 7 wherein the housing includes a shielding partition positioned adjacent to the substrate.

9. A device according to claim 8 wherein the housing includes a set of ledges for supporting the substrate.

10. A device according to claim 9 wherein the plurality of conductors are configured so as to substantially match an impedance of the device with an impedance of the host device.

11. A device according to claim 10 wherein a dielectric material being substantially positioned between each contact of the plurality of contacts.

12. A device according to claim 11 wherein the dielectric material being made of a polymer material.

13. A device according to claim 12 wherein the dielectric material being made of liquid crystal polymer.

14. A device according to claim 13, further comprising an electromagnetic shield mounted on the housing for preventing electromagnetic fields from passing between the housing and a host device panel cut-out.

* * * * *